US012563240B2

(12) United States Patent
Tonnerre et al.

(10) Patent No.: US 12,563,240 B2
(45) Date of Patent: Feb. 24, 2026

(54) IN-TESTING QUALITY OF EXPERIENCE OF CONNECTIVITY BETWEEN AIRCRAFT AND GROUND CONTENT SERVERS

(71) Applicant: Thales Avionics, Inc., Irvine, CA (US)

(72) Inventors: Arnaud Tonnerre, Rockledge, FL (US); Chet Thakar, Foothill Ranch, CA (US); Yann Nicolas, Melbourne, FL (US); Haiyan Li, Melbourne, FL (US)

(73) Assignee: Thales Avionics, Inc., Irvine, CA (US)

( * ) Notice: Subject to any disclaimer, the term of this patent is extended or adjusted under 35 U.S.C. 154(b) by 211 days.

(21) Appl. No.: 18/326,105

(22) Filed: May 31, 2023

(65) Prior Publication Data

US 2024/0406463 A1     Dec. 5, 2024

(51) Int. Cl.
H04N 21/214       (2011.01)
B64D 11/00        (2006.01)
(52) U.S. Cl.
CPC ...  H04N 21/2146 (2013.01); B64D 11/00155 (2014.12)
(58) Field of Classification Search
CPC ..................... H04N 21/2146; B64D 11/00155
USPC ........................................................ 725/76
See application file for complete search history.

(56) References Cited

U.S. PATENT DOCUMENTS

| | | | |
|---|---|---|---|
| 2017/0164199 A1* | 6/2017 | Kong ................. | H04L 63/1408 |
| 2020/0007410 A1* | 1/2020 | Walsh ................. | H04L 43/045 |
| 2023/0275943 A1* | 8/2023 | Suryavanshi ....... | H04L 41/5009 |
| | | | 709/217 |

* cited by examiner

*Primary Examiner* — Alfonso Castro
(74) *Attorney, Agent, or Firm* — Sage Patent Group

(57)          ABSTRACT

A communication connectivity QoE testing device within a vehicle includes a network interface to communicate through a cabin network, a display device to display video to a passenger of the vehicle, a processor, and a memory storing code executed by the processor to perform operations. The operations include to send content requests to and receive content from a content server that is offboard the vehicle using the network interface, the cabin network, and a wireless communication modem communicatively connected to the content server through a ground-based network. The operations generate a QoE metric based on measurements of end-to-end communications of the content requests sent and the content received between the QoE testing device and the content server. The operations send a report based on the QoE metric through the network interface, the cabin network, and the wireless communication modem to a network node of an operations center for analysis.

17 Claims, 2 Drawing Sheets

IN-TESTING QUALITY OF EXPERIENCE OF CONNECTIVITY BETWEEN AIRCRAFT AND GROUND CONTENT SERVERS

TECHNICAL FIELD

The present disclosure relates to monitoring performance of aircraft and other vehicle communication systems, such as in-flight communication connectivity systems.

BACKGROUND

Modern aircraft include a variety of communications and computer systems to provide in-flight entertainment (IFE) services to passengers. Aircraft typically provide wireless communication connectivity services with ground network nodes, such as content servers. Connectivity is typically provided through a satellite communications (SATCOM) system which relays communications through satellites and gateways connected to ground network nodes. The ground network nodes can include Internet webpage servers, streaming entertainment servers (e.g., NETFLIX, DIRECTV, etc.), gaming servers, etc.

Connectivity services are monitored using low level and network specific measurements such as bandwidth, latency, jitter, and packet loss. New measurements capabilities, called Quality of Experience (QoE) are emerging with the intent to provide a more accurate view of the passenger experience.

Airline operators have not been able to accurately assess their passengers' connectivity experience because measurement metrics have not been sufficiently tied to the user perspective. Moreover, measurements have been necessarily performed by connectivity service providers, e.g., satellite service providers, because the network measurements have required high-level integration and visibility to traffic flow through the connectivity system. It is difficult for the connectivity service providers to understand and interpret metrics from network measurements, as to how the metrics relate to passenger QoE. For instance, a ping measurement (periodic transmission of short messages) can be used to calculate the average latency of the connectivity system. The definition of a target criteria required to consider whether the performances are good is not trivial and the analysis required to make a correlation with the QoE of different applications is difficult and sometimes impossible.

Even with the emergence of new QoE metrics, the measurements are still under the control of the connectivity service providers. This creates a problem because the connectivity service providers can adapt their measurement methodology and associated scoring or criteria to report more positively biased indicators, when the actual experience of passengers is not as good as reported. Airline operators need an independent way to monitor the connectivity services they provide in order to collect valuable information on passenger satisfaction, to manage how connectivity service providers meet their Service Level Agreements (SLAs), to facilitate identification and remediation of performance issues, and to test robustness of the connectivity system. It is noted that presently, the SLAs are measured and reported by the connectivity service providers.

Measurements conducted by the connectivity service providers are not fully end-to-end since the end point initiating and receiving the measurements in the aircraft or other vehicle (e.g., ship, train, etc.) is located in a connectivity server operated by the communication service provider and connected directly to the communication link outside of the vehicle (e.g., SATCOM terminal). Measurements performed in the connectivity server do not consider performance of the components of the system that connect passenger devices to cabin wireless access points (e.g., WiFi access point, cellular base station, etc.) and from the cabin wireless access points to the connectivity server.

SUMMARY

A communication connectivity QoE testing device within a vehicle includes a network interface to communicate through a cabin network, a display device to display video to a passenger of the vehicle, a processor, and a memory storing code executed by the processor to perform operations. The operations include to send content requests to and receive content from a content server that is offboard the vehicle using the network interface, the cabin network, and a wireless communication modem communicatively connected to the content server through a ground-based network. The operations generate a QoE metric based on measurements of end-to-end communications of the content requests sent and the content received between the QoE testing device and the content server. The operations send a report based on the QoE metric through the network interface, the cabin network, and the wireless communication modem to a network node of an operations center for analysis.

These and other operations and methods disclosed herein can non-intrusively measure the QoE of passengers who are utilizing communication connectivity services provided to offboard ground based content servers. For a passenger vehicle operator (such as an airline operator), a communication service provider (such as a satellite or cellular service provider), and/or a manufacturer of vehicle entertainment systems (such as inflight entertainment systems), how well the communication connectivity services are performing from the passengers' perspectives is important for the success of the service. Moreover, passenger electronic devices (e.g., phones, tablets, etc.) which are being used to interface with the cabin networks may be the source of performance limitations or problems. The QoE metrics can be used to effectively identify the QoE irrespective of whether the services are accessed through passenger electronic devices or through carrier provided display units, and can enable analysis of the source of system operational limitations or problems.

Other QoE testing devices and related methods and computer program products according to embodiments of the present disclosure will be or become apparent to one with skill in the art upon review of the following drawings and detailed description. It is intended that all such additional QoE testing devices, methods, and computer program products be included within this description and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

Figure 1:
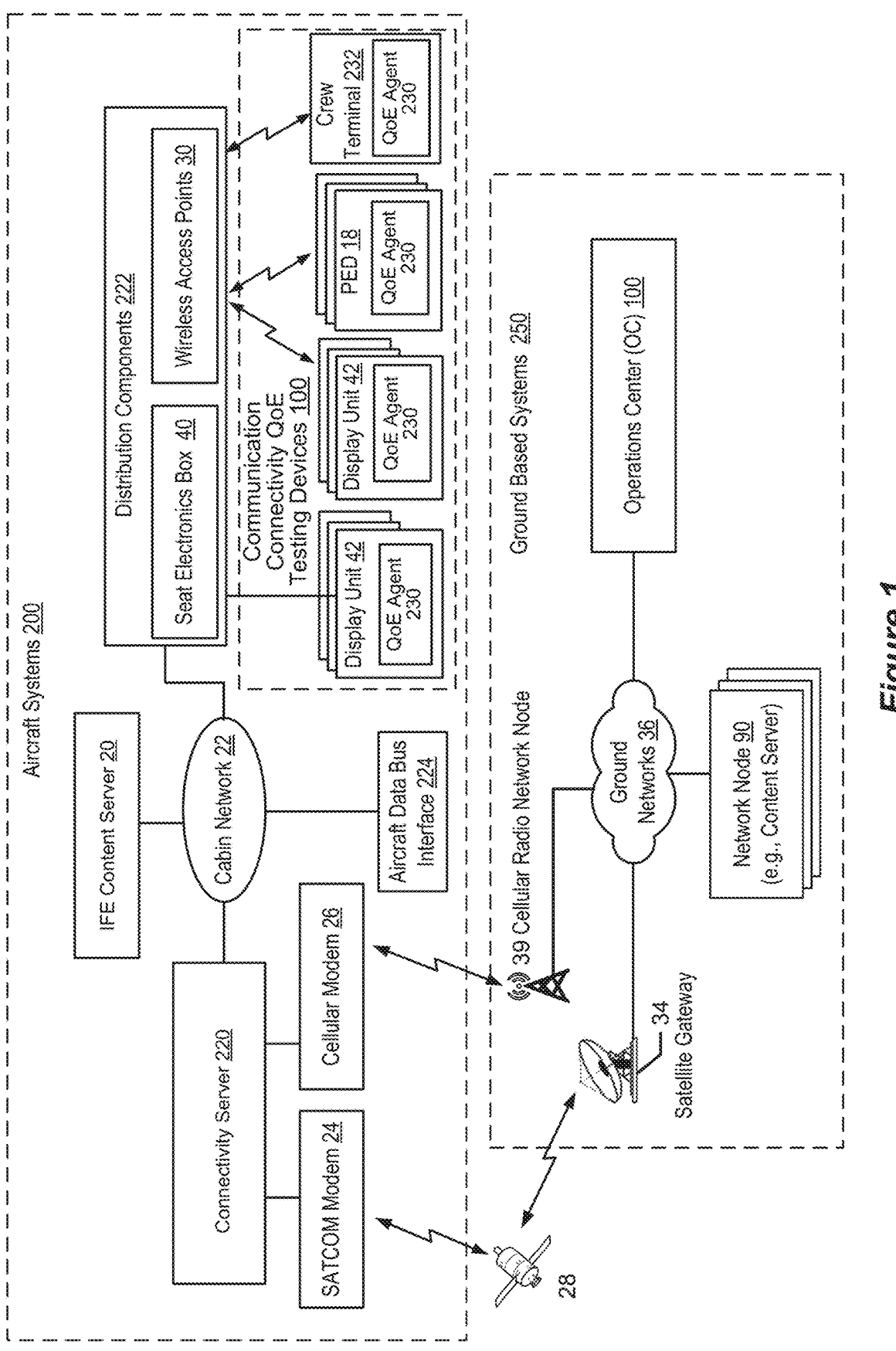
FIG. 1 illustrates aircraft systems which include communication connection QoE testing devices which generates QoE metrics indicating passenger connectivity quality of experience, and illustrates ground-based systems which include an operations center that processes the QoE metrics, in accordance with some embodiments.

In the following detailed description, numerous specific details are set forth in order to provide a thorough understanding of aspects of the invention. However, it will be understood by those skilled in the art that the present invention may be practiced without these specific details. In other instances, well-known methods, procedures, components and circuits have not been described in detail so as not to obscure the present invention.

Although various embodiments are explained herein in the context of generating and using QoE metrics for connectivity systems used with an In-Flight Entertainment (IFE) environment of an aircraft, other embodiments are not limited thereto and may be used with other types of vehicles, including, without limitation, ships (e.g., cruise ships), buses, and trains.

Embodiments of the present disclosure are directed to non-intrusively measuring the quality of experience of one or more passengers (users) utilizing one or more cabin networks within a vehicle to obtain content from ground node, e.g., content servers. For an airline operator and connectivity service provider, how well the communication connectivity service is performing from particular passengers' perspectives is important for the success of the service. While the hardware platform(s) may be functioning properly, software components and other factors (such as RF interference in a wireless network) may still result in a poor passenger experience. Moreover, Passenger Electronic Devices (PEDs) used by some passengers to interface to the cabin networks may be the source of performance limitations or problems. The passenger QoE metrics for the connectivity service can be used to identify the source of such limitations or problems.

Some embodiments are directed to measuring QoE of passenger connectivity through end-to-end measurements of QoE related metrics for end-to-end communications between passenger facing components of an IFE system and ground content servers. A so-called "N+1 Client Agent", which adds one additional virtual user to conduct assessment of the system performances, can provide a limited view of passenger QoE because it is dependent on the traffic generated by the real passenger at the time of the measurements. If at this time, the aggregated traffic is low, then the performance for the virtual user will be high since it is in contention for communication resources with a few users for instance. Various embodiments are directed to providing a more comprehensive assessment of QoE of the communication service provided to for passengers.

Various operations and methods that can be performed to provide improved monitoring and analysis of passenger QoE connectivity experiences are described below in the non-limiting context of an aircraft IFE environment. However, these and other embodiments may be used for testing communication connectivity between ground network nodes and any type of vehicle, including, without limitation, ships (e.g., cruise ships), trains, subways, etc. The term passenger is broadly used to refer to any user who is transported by a vehicle, and includes crew, paying customers, etc.

Overview of Aircraft Systems and Ground Based Systems:

FIG. 1 illustrates a block diagram of example aircraft systems 200 and ground-based systems 250 which provide passenger centric end-to-end measurement and analysis of communication connectivity QoE according to some embodiments of the present disclosure.

Passengers during flights can access content provided by offboard (ground) network nodes 90 through wireless connectivity services provided by airline operators. For example, passengers can surf Internet websites, stream video and audio from on-demand content providers (e.g., NETFLIX, DIRECTV, etc.), watch broadcast programming, play games, shop, read electronic books, etc. Passengers can view and/or listen to content from offboard network nodes 90 through seat display units 42 and/or passenger electronic devices (PEDs) 18. Display units 42 can be mounted to seatbacks, tray tables deployable from armrests, and/or other seat structure or cabin structure. The PEDs 18 may correspond to any passenger transportable electronic device having wireless communications capabilities, including, without limitation, tablet computers, laptop computers, palmtop computers, cellular smart phones, game players, etc. PEDs 18 may be passenger owned devices or owned by airlines and provided for temporary use by passengers for the duration of a flight.

Distribution components 222 communicatively connect the display units 42 and PEDs 18 to other components of the aircraft systems 200 via a cabin network 22 (e.g., Ethernet) and wired communication connections provided by seat electronic boxes 40 (e.g., each mounted to a row of seats) and/or through wireless communication connections provided by wireless access points 30 which can be spaced apart along the aircraft cabin. The wireless access points 30 may be WiFi access points (e.g., IEEE 802.11), cellular-based access points (e.g., 3GPP 5G pico cell radio base station), etc. Offboard communication connectivity is provided by a connectivity server 220 which communicates through a SATCOM modem 24 and associated satellite antenna and/or through a cellular modem 26 and associated cellular antenna.

The aircraft systems 200 can further include an IFE content server 20 which may distribute broadcast programming and/or streaming content received via the connectivity server 200 and/or locally stored content to display units 42 and PEDs 18. The IFE content server 20 may provide flight information, e.g., aircraft location, flight path, moving maps, etc., to passengers based on data from an aircraft data interface 224. Crew may use cabin-crew terminal(s) 232 to interface with the IFE content server 20, the connectivity server, and other components of the aircraft systems 200.

The ground-based systems 250 includes the network nodes 90 and an operations center (OC) 100 which communicate with the aircraft systems 200 through satellite gateways 34 and/or cellular radio network nodes 39. Although operations center 100 is illustrated as a single entity, in practice it may be a plurality of network nodes which may or may not be contractually associated with or controlled by a common entity. The satellite gateways 24 are configured to communicate with the SATCOM modem 24 via a constellation of satellites 28, e.g., geostationary satellites, mid Earth orbit satellites, low Earth orbit satellites, etc. The cellular radio network nodes 39, e.g., 3GPP 5G eNB base stations, are configured to communicate via direct air-to-ground pathways with cellular modem 26.

End-to-End QoE Testing:

In accordance with various embodiments herein, the aircraft systems 200 of FIG. 1 include one or more passenger-facing communication connectivity QoE testing terminals 100, each of which executes a QoE agent configured to generate QoE metric(s) which characterize performance of the communication connectivity experienced by passengers during flight.

Integration of QoE agents into certain components of the aircraft systems 200 provides a change of architecture configured to monitor and report connectivity system performances and passenger QoE. QoE agents contain performance measurement software (e.g., Python scripts) and can be integrated into components equipped with a wireless communication capability and which are installed or available in the cabin of an aircraft or other vehicle. The QoE agents can use the wireless communication capability of the components, in which it has been integrated, to communicate with a ground network node(s) 90 (which may be on-premises servers of a service provide or airline operator, or may be public platforms on Internet such as by commercial streaming operators) in order to conduct measurements. QoE agents can measure performance metrics such as bandwidth, latency, jitter, and packet loss, as well as other QoE metrics for portal access and applications such as web browsing, video and audio streaming, emailing, real-time communication (e.g., video call) and file transfer, as will be described in further detail below. QoE metrics can be generated based on measurements of webpage loading time, video stream re-buffering count, along with numerous other types of measurements discussed below.

As an example, for commercial aviation, the QoE agents can be integrated in the display units 42 (e.g., seatback displays), the cabin-crew terminal 232 (e.g., crew management terminal (ICMT)), PEDs 18, or any other equipment which may be configured for wireless communications (e.g., WAPs 30).

An example use case is the integration of a QoE agent in a PED 18, such as a mobile phone, in the form of a QoE agent application that may be loaded from an application store, such as the Google or Apple application stores. The QoE agent application may be associated with an airline, such as an airline application, and/or with a connectivity service provider, such as Gogo Business Aviation. The QoE agent application may thereby be a component of a larger functionality application, such as an airline application providing reservation capabilities, schedule tracking capabilities, airline loyalty rewards capabilities, etc. The QoE agent application may be downloaded to a PED before flight or during flight from an on-board server 20 via a cabin network, e.g., WAP 30.

The QoE agents can be integrated in the PEDs 18, the display units 42, and the cabin-crew terminal 232, and/or in another component of the aircraft systems 200 involved in providing communication connectivity to passengers. The aircraft system components which include QoE agents for performing testing communication connectivity from passengers' perspectives are also referred to as QoE testing devices 100.

The QoE agents may be controlled by the operations center 100 to initiate QoE testing, control periodicity or other triggering events for QoE testing, control types of testing performed by QoE agents, control types of QoE metrics generated by QoE agents from measurements, control periodicity and/or triggering events for reporting of QoE metrics to the operations center 100, and/or control what QoE metrics and associated information is reported. Operations center 100 may be managed by the airline operator, the communications connectivity service provider, and/or another entity. The number of QoE agents activated for testing and reporting as well as the software scripts (target applications, metrics, measurement methodology, frequency of the measurements . . . ) can be initially configured and adapted over time by the operations center 100 and/or autonomously by the QoE agents as will be explained in further detail below. Each activated QoE agent can operate to conduct QoE measurements, generate responsive metrics, and report the metrics and other defined information (as explained below) to the operations center 100.

The operations center 100 may be more than one network node, such as one network node that controls QoE agent operation and another network node (e.g., Monitoring Management System) that collects the reported QoE metrics, processes the QoE metrics (e.g., statistic computations, filters or excludes QoE metrics, correlates QoE metrics based on location of QoE agents in cabin, location of aircraft along route, angle of satellite beam, angle of cellular beam, etc.), calculate scoring and generate user information display, e.g., dashboard with QoE reporting information and indicators.

Figure 2:
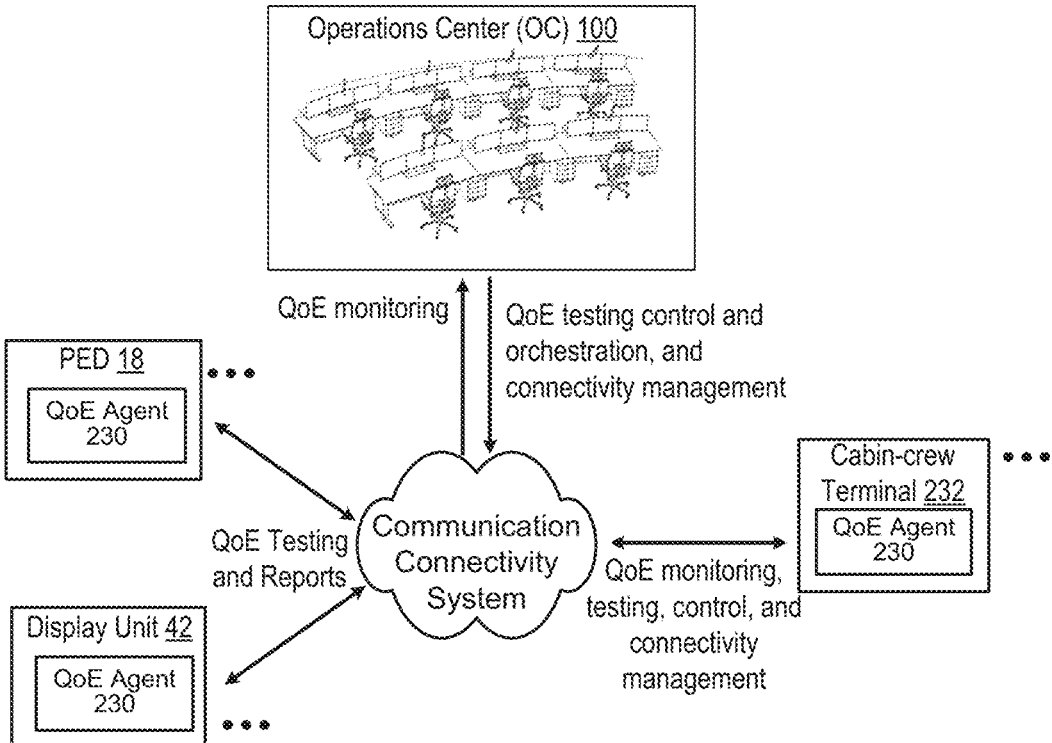
FIG. 2 illustrates example operations of the passenger electronic devices, the crew terminal, and the operations center of FIG. 1 for QoE testing, control, orchestration, and connectivity management in accordance with some embodiments.

FIG. 2 illustrates example operations of the PEDs 18, display units 42, the operations center 100, and the cabin-crew terminal(s) 232 for QoE testing, control, orchestration, and connectivity management in accordance with some embodiments. Referring to FIG. 2, the PEDs 18 and display unit 42 perform QoE testing of communication connectivity system performance to generate defined types of QoE metrics which are then reported to the operations center 100 and may be further reported to the cabin-crew terminal 232. The operations center 100 and the cabin-crew terminal 232 may monitor the reported QoE metrics and responsively control and orchestrate the QoE testing and reporting, and may further manage operation of the connectivity system responsive to the QoE metrics as explained in further detail below.

By configurating display units 42, PEDs 18, and other QoE testing devices 100 dispersed throughout the cabin to perform QoE testing, the airline operators and/or connectivity service providers are able to create a diverse network of virtual passengers to conduct both simple testing and more complex assessments.

The network of QoE testing devices 100 serving as virtual passengers can provide new ways of conducting performance assessment which more accurately indicate passenger experience and which can provide a detailed map of QoE throughout the cabin, track dynamic changes in QoE over time, and correlate QoE to the corresponding connectivity device configurations and environment. Previously, connectivity service providers may have conducted the measurements themselves by either exploiting user data (e.g., statistics using Deep Packet Inspection tools) or making measurement with a N+1 Client Agent which acted as one single virtual user.

The use of a network of virtual passengers as QoE agents allows more robust assessment of performances independently from the specific passenger behavior at the time of the measurements. Activation of multiple QoE agents for testing when there is none or below a defined threshold level of Internet or streaming traffic or when there are less than a threshold number of passengers using display units 42 and/or PEDs 18 for accessing content from ground network node(s) 90 is a way to have more robust assessment of the expected performances of the system.

With reference to FIGS. 1 and 2, testing of QoE can include testing performance and operation of components of the aircraft systems 200, satellite network and/or terrestrial cellular network, and components of the ground based systems 250, along data paths from the display units 42 and/or PED 18 through the seat electronics box 40 or wireless access points 30 of the distribution components 222, cabin network 22, connectivity server 220, a combination of the SATCOM modem 24 and satellite antenna and satellite 28 network and gateway 34 or a combination of the cellular modem 26 and cellular antenna and cellular radio network node 39, the ground networks 36 (e.g., public and/or private networks) and one or more network nodes 90.

QoE testing and measurements may be performed autonomously by the QoE agent or may be performed responsive to commands from an onboard controller (cabin-crew terminal 232, connectivity server 220, etc.) and/or an offboard controller (operations center 100, etc.). For example, an onboard or offboard controller may trigger (initiate) execution of the QoE agent on one or more defined PEDs 18, display units 42, and/or crew terminals 232. The onboard or offboard controller may schedule how often the QoE agent performs QoE measurements and/or how often the QoE agent reports QoE metrics generated based on the QoE measurements. The onboard or offboard controller may adapt one or more parameters of a QoE reporting rule used by the QoE client agent to determine a trigger event for reporting QoE metrics generated based on the QoE measurements.

In some embodiments, the QoE agent may provide a client interface through which a crew member or passenger may trigger and/or control periodicity QoE measurements and/or the generation and reporting of QoE metrics, and may control what type(s) of QoE measurements are performed and/or what type(s) of QoE metrics are generated and reported. The client interface may poll a passenger to obtain indication of the passenger's perception of the QoE with communication connectivity according to identified metrics and/or the passenger's perception of potentially lower and/or higher quality aspects of the QoE with communication connectivity, and convert the passenger's input into measurement actions which trigger and/or control periodicity of QoE measurements and/or the generation and/or reporting of QoE metrics by one or more QoE agents 230, and which may control what type(s) of QoE measurements are performed and/or what type(s) of QoE metrics are generated and reported by one or more QoE agents 230.

In some embodiments, programmatic scripts of QoE agents, such as Python scripts, are run in the background of the application providing content streaming and/or web browsing, and statistics are generated using all passenger related QoE metrics to generate and report QoE benchmarks between, e.g., airline operators and connectivity service providers.

QoE testing may include initiating operations to obtain content from a defined network node 90 (content server) but without displaying a video component and/or audio component of the content on a display of the host device, e.g., display unit 42, PED 18, and/or cabin-crew terminal 232.

In one embodiment, the QoE agent sends a webpage request through the network interface to the content server 90, receives and displays webpage content from the content server on a display device. The QoE agent generates the QoE metric based on measurements related to sending of the webpage request and when operations to initially display the webpage content on the display device are completed. In a further example, the QoE agent can send a webpage request through the network interface to the content server 90, receive webpage content from the content server 90 on the display device, discard the webpage content without having allowed display of any of the webpage content on the display device, and generate the QoE metric based on measurements related to (e.g., elapsed time between) sending of the webpage request and receipt of all of the webpage content.

In another embodiment, the QoE agent sends a request for a network node 90 (content server) to stream video from an identified content file, receives the streaming video and perform QoE measurement(s) based the received video, but while preventing display of the video on a display device of the host device. For example, the QoE agent may receive a stream of video packets for measurement operations but discard the video packets without passing to another application of the host device which functions to display video (e.g., video decoding, conditioning, and displaying), e.g., to avoid displaying test video to the passenger. In a further example, the QoE agent can send a video streaming request through the network interface to the content server 90, receive a stream of video packets from the content server 90, discard the video packets without having allowed display of any video content of the video packets on the display device, and generate the QoE metric based on measurements related to (e.g., elapsed time between) sending of the video streaming request and receipt of a defined number of the video packets.

In another embodiment, the QoE agent sends a request for a network node 90 (content server) to stream audio from an identified content file, receive the streaming audio and perform QoE measurement(s) based on the received audio, but while preventing playout by the host device of the audio through a speaker, audio output jack, and/or through a Bluetooth connection to a speaker (e.g., passenger Bluetooth headset), e.g., to avoid displaying test audio to the passenger. For example, the QoE agent may receive a stream of audio packets for measurement operations but discard the audio packets without passing to another application of the host device which functions to playout audio (e.g., audio decoding, conditioning, amplification, etc.). In a further example, the QoE agent can send an audio streaming request through the network interface to the content server 90, receive a stream of audio packets from the content server 90, discard the audio packets without having allowed play out of any audio content of the audio packets through a speaker interface, and generate the QoE metric based on measurements related to (e.g., elapsed time between) sending of the audio streaming request and receipt of a defined number of the audio packets.

In another embodiment, the QoE agent sends a gaming command to a gaming server (network node 90) to request the gaming server to acknowledge receipt of the command but to not input the gaming command to a game which is hosted by the gaming server and being played by a passenger, and the QoE agent performs QoE measurement(s) based on the received acknowledgment from the gaming server. In another embodiment, the QoE agent requests data from the gaming server (network node 90) and performs measurements based on the request and associated response(s) from the gaming server, but without providing the response(s) to a user interface for display or audio playout to the passenger. In a further example, the QoE agent sends a gaming command through the network interface to a gaming server to request the gaming server to acknowledge receipt of the command but to not input the gaming command to a game which is hosted by the gaming server and being played by a passenger using the display device, receives an acknowledge message from the gaming server, and generates the QoE metric based on measurements related to (e.g., elapsed time between) sending of the gaming command and receipt of the acknowledge message.

In another embodiment, the QoE agent sends a gaming command to a gaming server (network node 90), and receives a gaming response message from the gaming server containing updated gameplay content directed to a gaming application being executed by the processor from the memory to update gameplay for the passenger. The QoE agent discards the updated gameplay content from the gaming response message without being provided to the gaming application (e.g., to avoid gaming responses used for testing from affecting gameplay or being displayed to the passenger), and generates the QoE metric based on measurements related to sending of the gaming command and receipt of the gaming response message.

For an integrated solution, flight data may be provided automatically (for instance using WiFi portal or an airline or service provider application). For a specific QoE agent enabled application, flight information may be provided through input by the passenger or obtained from the aircraft data bus interface 224 or elsewhere. The QoE agent can operate to associate flight information with the QoE measurements for reporting to the operations center 100.

In some embodiments, the QoE agents run scripts in the background of the host devices with the runtime configured to reduce or minimize impact on utilization of resources (e.g., processor resource utilization, graphical rendering resource utilization, communication processing resource utilization, and/or communication pathway resource utilization). For example, a decision be made by a controller and/or by the QoE agent itself, whether to activate a QoE agent for QoE measurements based on determining or predicting that certain host device resources are being utilized less than a threshold loading (e.g., host device is idle). In one operational scenario, the controller and/or QoE agent does not activate the QoE agent for QoE measurements on a display unit that is playing a movie or other streaming video content for a passenger, and may instead activate another QoE agent to perform QoE measurements on an adjacent display unit which is idle (e.g., not presently playing a movie or other streaming video content to a passenger). Alternatively, the controller and/or QoE agent may initiate QoE measurements responsive to determining or predicting that processing and networking resources of a particular display unit are presently above a threshold level.

Controlling when QoE agents perform measurements and what types of measurements are performed, can be adapted so that an airline passenger using a seatback display unit hosting a QoE agent would not notice a difference in performance compared to a conventional IFE seatback display unit which is not capable of or not performing QoE testing. When hosted by an aircraft component (e.g., display unit 42), the QoE Agent can need to be allowed to access certain types of information for measurements used to generate QoE metric(s) and for reporting to the operations center 100. For example, the QoE agent can include or be granted access to timers and may generate or be granted access to observe another application's packets, e.g., by being configured to receive and forward packets from or to the other application (e.g., entertainment application) or be notified of events related to transmission and reception of packets by another application. An example granting of rights can include enabling a QoE agent to monitor packet traffic to a PED application, e.g., NETFLIX application receiving streaming video. The QoE agent may be operationally configured to monitor packet traffic communicated between a PED 18 and a display unit 42, such as during PED Casting and PED mirroring operations. The QoE agent may be provided access to timing data and aircraft information, such as the flight number e.g., via the aircraft data bus interface 224, and may be provided connectivity pathway(s) to offboard resources, such as the Internet (e.g., Internet purchased plan) and network node(s) 90.

Example Use Cases and Operational Benefits of Some Embodiments

As explained above, various embodiments provide end-to-end QoE testing via performance measurements and generate QoE metrics which are indicative of the QoE passengers using connectivity services through PEDs 18, display units 42, and other passenger (end-user) facing devices. The QoE testing can be performed without the need to rely on connectivity service providers to conduct such testing and report their selectively filtered and combined metrics. When hosted by the PEDs 18 and display units 42, the QoE agents can connect to the ground networks 36, e.g., Internet, and network node(s) 90 through the same wireless access point(s) 30 and same or similar communication pathways for QoE testing as are used by passengers for consuming entertainment services, e.g., ground Internet web servers and content streaming services.

These embodiments can thereby enable an airline operator, railway operator, etc. to conduct independent assessment of passenger communication connectivity experience using detailed QoE measurements and resulting metrics. Although some examples are discussed in the content of the QoE agents being controlled by or reporting to an airline or other vehicle operator and/or by a communication connectivity service provider, they may alternatively or additionally be controlled by and/or reported to another entity (third party) that does not necessarily have a contractual relationship with the airline or other vehicle operator and/or the communication connectivity service provider. For instance, the QoE agent may be provided as a new service of an IFE service provider installed in their seat display units and/or as an application for PEDs 18 providing IFE service during flights.

Various embodiments can address important use cases based on the versatility and configurability of the QoE agent operations and the hosting devices. The use cases can include any one or more of:

1. Independent monitoring of In-Flight Connectivity (IFC) performance based on there being no requirement for access to data visible only within equipment used for providing communication connectivity and/or which is proprietary information of a communication connectivity service provider.
2. Verification and validation of the IFC system through QoE metrics and measurement data points that can be compared to content of reports from a communication connectivity service provider.
3. Assessment of the performance of a specific tail in order to assess passenger satisfaction and identify presence and/or types of problems or, e.g., to prepare for a premium passenger flight.
4. QoE measurements can be reported with detailed information which enables correlating QoE with aircraft (e.g., log tail number), aircraft location, aircraft heading, satellite elevation angle (e.g., angle of antenna beam from antenna to satellite relative to fuselage plane/horizontal), cellular base station declination angle (e.g., angle of antenna beam from antenna to base station relative to fuselage plane/horizontal), SATCOM and/or cellular modem configuration parameters (e.g., number of communication beams, allocated frequency channels, modulation and coding settings, communications frequency and time resources granted for use, etc.).

5. Service Level Agreement measurements and reporting from a solution that is independent from the service provider capabilities, and which can be used by the airline operator to independently perform measurements which are more accurately indicative of the passenger perspective of QoE with communication connectivity.

6. Certification assessments, which require independent assessment.

These and other embodiments may operate to provide one or more of the following operational advantages to airline operators and/or inflight communication connectivity service providers:

1. Internal and independent assessment of passenger satisfaction with the Internet service, and which may eliminate or reduce the need for passenger surveys.

2. The operations monitoring performance of the inflight connectivity system, enable airline operators and/or inflight connectivity service providers to highlight specific concerns with system performance and which can be analyzed using detailed statistics based on the reported QoE metrics.

3. Independent monitoring of the Service Level Agreements (SLAs) between an airline operator and in-flight connectivity service provider can be independently performed by both parties. Because the inflight connectivity equipment in the cabin is fixed in location and capabilities, operations can obtain an initial QoE metric baseline or other period QoE metric baseline for comparison over time to currently generated QoE metrics. This comparison over time can determine whether device operational parameters need to be changed, communication resources allocated for use along certain routes and/or by certain aircraft and/or in certain geographic regions should be increased or can be decreased based on requirements of the SLAs and based on other rules.

4. A new approach is provided to conduct large scale testing of the communication connectivity system with repeated measurements by end point devices to stress the system along the entire communication pathway (end-to-end) to determine weaknesses or performance improvement requirements. As an example, by deploying the QoE agent software in all seatback displays, the amount of traffic through the pathways can be dynamically controlled according to defined profiles having possibly large dynamic ranges which can be adapted to simulate to a wide range of loading envelope conditions and/or to identify zones of particular communication resource contention in the cabin. The testing can also identify operational loading ranges which can be safely supported without becoming resource constrained in ways that result in unacceptable QoE provision to passengers.

Some further embodiments are directed to operations for modifying what type of QoE measurements are performed, what type of QoE metrics are generated from the QoE metrics, what triggering events are defined for initiating the QoE measurements and/or reporting of the QoE metrics, what type of information is associated with QoE measurements and included in reporting of the QoE metrics, etc. Types of QoE Testing and Generated QoE Metrics:

In some embodiments, the QoE agent operates to perform one single QoE measurement at a time, where the sequential single measurement process can avoid impacting performance (in a way that may be perceived by the passenger) of the host device (e.g., PED, seat video display unit, etc.) and performance of the communication connectivity components (e.g., cabin network(s), SATCOM/cellular modem, etc.), so that the generated QoE metrics are more accurately representative of the passenger's current QoE with the communication connectivity service. For example, the QoE agent may perform measurement of a first webpage loading time for a single or sequence of webpages and, once completed, then perform video streaming measurements. For example, the QoE agent may send a webpage request for the first webpage and the measure elapsed time from sending the request to completion of the first webpage loading time (i.e., content of first webpage is fully displayed on display device). In some other embodiments, some types of QoE measurements which have a relatively low impact, such as communication ping measurements of round-trip timing, jitter, etc., can be performed in parallel (i.e., at least partially overlapping in time).

The QoE agent may be configured to select one or more types of QoE measurements to be performed which are adapted to capture in the QoE metrics indications of dynamically changing performance of the communication connectivity service over one or more phases of a flight. For example, the QoE agent may repetitively perform QoE measurements for one single webpage (e.g., Yahoo.com) to continuously assess the variation of passenger QoE using a selected measurement configuration that performs only webpage loading measurements associated with one or multiple metrics, which may include one or more of: first contentful paint (FCP), largest contentful paint (LCP), first input delay (FID), Webpage loading time, and webpage loading successful rate.

The QoE metrics generated from the QoE testing can be stored in memory associated with equipment configuration information which identifies current aircraft location, flight route, and SATCOM modem configuration parameters, cellular modem configuration parameters, aircraft to ground communication antenna configuration (e.g., beam steering parameters, modulation coding scheme, allocated frequencies, wireless resource scheduling parameters, etc.), aircraft network configuration parameters, for purposes of being included in reporting to the operations center 100 or other network node for analysis. Reporting the QoE metrics with equipment configuration information can allow correlation of passenger QoE and variation thereof with particular combinations of individual settings of equipment configuration parameters. The QoE agent may operate to select different types of QoE measurements and perform defined types of QoE metric statistics based on the different types of QoE measurements, e.g., to provide a more comprehensive assessment of QoE for different types of passenger applications (e.g., web browsing, streaming video, streaming audio, gaming, etc. through communication connectivity to one or more remote (ground-based) offboard servers).

The QoE agents can be configured to be the source of requests for content on one or more of the network nodes 90 to perform quantitative measurements of performance of the communications for the bi-directional traffic flow. Alternatively, or additionally, the QoE agents can be configured to "observe" the bi-directional traffic flow between other software residing on PEDs and/or display units 42 to perform quantitative measurements of performance of the communications for the bi-directional traffic flow. For example, a PED-hosted QoE agent may be configured as an application wrapper that is coded to observe or is granted permission to observe (e.g., by the operating system and/or user setting) application programming interface (API) traffic to and from another application hosted by the PED, e.g., observing API traffic to and from a streaming content application (e.g., NETFLIX, etc.). A QoE agent may perform deep packet inspection to identify which on-board or off-board service is associated with the communication (e.g., streaming video from Amazon web server) and/or which operational state of a protocol is being invoked by the packet.

Various embodiments of the QoE agents may operate to actively analyze packet flows and/or related protocol transitions between end-point devices (e.g., PEDs 18, display units 42, etc.) and service end points (e.g., network node(s) 90). For example, in some systems there are specific known packet exchanges that are expected to be observed by the QoE agents when the service end points and cabin network components are operating normally. These exchanges can be detected and analyzed, to determine whether the associated services are both available and have acceptable performance metrics compared to acceptable availability policies and performance rules. QoE can be measured, such as the timing jitter experienced between packets provided in a sequence for a service, error rate across the packets, packet retransmission rates due to errors or dropped packets, etc. as will explained in further detail below.

As part of the measurement process, both quality and performance attributes can be analyzed. The throughput and latency of the packet exchanges can be analyzed to detect if there is system degradation that satisfies a defined action rule which triggers an associated defined remediation action. Retransmissions of packets and/or flow control requests can be observed and measured to detect potential communication performance bottlenecks, presence of interfering passenger terminals, poorly operating passenger terminals, and other system communication issues.

Configuration of the QoE Testing:

Configuration of the type of QoE test(s) being performed can be dynamically adjusted based on, e.g., what type of passenger application(s) have been executed or are being executed by the PED 18, display unit 42, etc. For example, the QoE agent can be configured to measure QoE by measuring performance metrics based on sending requests to access content of a set of different webpages which are selected to have different content size requirements, host device processing requirements (e.g., video, audio, static graphics, text, etc.), executable code requirements (e.g., CODECs, certain software programs or applications), etc., in order to assess a range of possible passenger experiences.

The QoE agent may be configured to perform QoE testing by measuring performance metrics based on sending requests to access content of a set of reference webpages. The set of reference webpages may be selected from among a plurality of sets based on the present geographic location of the aircraft, a flight route of the aircraft, time of day and/or day of year, satellite beam elevation angle being indicative of imminent or non-imminent satellite handoff, cellular beam declination angle being indicative of imminent or non-imminent cellular base station handoff, etc.

Generating QoE metrics based on a combination of such different QoE measurements may provide a more accurate assessment of actual passenger QoE with the connectivity service, but may provide less data resolution to limit ability of the operator team to monitor and assess the variation of experience during the flight.

Frequency of QoE Testing:

QoE testing may be performed periodically at a frequency that can be adjusted, e.g., from a few seconds or a few minutes to 30 minutes or 1 hour. As will be explained in further detail below, events may be defined that trigger initiation of QoE testing and/or reporting of generated QoE metrics to the operations center 100 and/or another network node, or which control the frequency and/or timing of repeated QoE testing and/or reporting of generated QoE metrics. Some embodiments are directed to reducing or minimizing the network traffic consumption in cases where a large number of PEDs 18, seat display units 42, etc. within a single aircraft host QoE agents operating to test and report QoE and/or when a large number of aircraft are being monitored. In some objective scenarios, assessment of communication connectivity QoE for a fleet of aircraft is performed without detailed correlation across the network, communication modem, and/or antenna parameters and performance metrics.

Events Triggering QoE Testing and/or QoE Metric Reporting:

In one embodiment, QoE testing and/or QoE metric reporting are initiated responsive to a handover event indicating handover from one satellite to another satellite or, similarly, responsive to a handover event indicating handover from one cellular base station to another cellular base station. For example, the QoE agent may poll or be informed by an onboard satellite communication (SATCOM) modem (or cellular modem) or a module communicatively connected to the SATCOM modem (or cellular modem) that a satellite handover (or cellular base station handover) is being initiated or will be initiated within a threshold time.

In another embodiment, QoE testing and/or QoE metric reporting are initiated responsive to determining an elevation angle of a satellite presently providing a ground data link for onboard SATCOM modem and antenna satisfies a defined rule. For example, the QoE agent may poll or be informed by the SATCOM modem or a module communicatively connected to the SATCOM modem that the satellite elevation angle is less than a defined threshold, where the threshold may be defined to be associated with anticipated lower QoE connectivity leading up to and during the handover processes.

In another embodiment, QoE testing and/or QoE metric reporting are initiated responsive to the SATCOM modem indicating signal quality (e.g., received signal strength, bit error rate, etc.) of the satellite radio link does not satisfy a defined rule.

In another embodiment, QoE testing and/or QoE metric reporting are initiated responsive to a handover event indicating imminent (e.g., within a threshold time) processes for handover from one ground-based cellular base station (BS) to another ground-based cellular BS. For example, the QoE agent may poll or be informed by an onboard cellular modem, e.g., a 3GPP 5G and/or 4G compliant modem, or a module communicatively connected to the cellular modem that handover is being initiated or will be initiated within a threshold time.

In another embodiment, QoE testing and/or QoE metric reporting are initiated responsive to determining a declination angle of a beam from an aircraft cellular antenna to a cellular BS presently communicating with the onboard cellular modem satisfies a defined rule. For example, the QoE agent may poll or be informed by an onboard cellular modem or a module communicatively connected to the cellular modem that the BS declination angle is less than a defined threshold, where the threshold may be defined to be associated with anticipated lower QoE connectivity.

In another embodiment, QoE testing and/or QoE metric reporting are initiated responsive to the cellular modem indicating signal quality (e.g., received signal strength, bit error rate, etc.) of the BS radio link does not satisfy a defined rule.

In another embodiment, ping measurements are initiated and used for QoE testing and/or the resulting QoE metric reporting is initiated responsive to determining that ping timing has become excessive (e.g., does not satisfy a defined rule). In a further embodiment, the frequency of ping measurements used for QoE testing and/or the resulting QoE metric reporting is adjusted based on the ping timing, e.g., with the frequency increasing responsive to ping time increasing according to a defined rule and with the frequency decreasing responsive to the ping timing decreasing according to the defined rule.

In another embodiment, the number of QoE agent(s) activated, the types of QoE testing and/or QoE metrics generated therefrom, and/or the locations where QoE agents are hosted (e.g., in which devices) can be controlled based on network loading satisfying defined loading condition(s), e.g., such as to test QoE while passenger traffic is in different defined threshold loading ranges.

In another embodiment, the number of QoE agent(s) activated, the types of QoE testing and/or QoE metrics generated therefrom, and/or the locations where QoE agents are hosted (e.g., in which devices) can be controlled based on geographic location of the aircraft, such as to provide more robust testing and reporting of QoE when the aircraft is proximately located (e.g., within threshold range) or regions or locations where insufficient QoE for communication connectivity has been historically measured.

The number of QoE agents involved in QoE testing and/or the types of measurements performed can be controlled based on the types of communications equipment handling in-cabin and/or air-to-ground communications (e.g., SAT-COM versus cellular communication, type of satellites involved, types of cellular base stations involved, communication resources (e.g., frequency and/or transmission and/or reception time opportunities) allocated for use.

The number of QoE agents involved in QoE testing and/or the types of measurements performed can be controlled based on identifying a possible failure condition of on-board communication equipment, identifying a possible erroneous operation of on-board communication equipment, and/or identifying a low performance condition that does not satisfy a rule.

The location of QoE agents in which type(s) of devices (e.g., PED, SVDU, WiFi access point (AP) based, etc.) being initiated and used for QoE testing can be controlled based on identifying a possible failure condition of on-board communication equipment, identifying a possible erroneous operation of on-board communication equipment, and/or identifying a low performance communications condition that does not satisfy a defined rule.

The number of QoE agents involved in QoE testing, the types of measurements performed, and/or the location of QoE agents in which type(s) of devices (e.g., PED, SVDU, WiFi AP based, etc.) involved in QoE testing can be controlled based on whether the testing is for an aircraft having tail number that is identified as being among a defined list. For example, QoE testing can be performed with high frequency and fidelity of metric and information reported to the operations center 100 for aircraft having specific tail numbers identified in a list associated with historical performance issues (e.g., on which passengers have reported unsatisfactory (low) QoE with connectivity), where performance issues are anticipated to occur based on a planned flight path, and/or on which a "very important person" (VIP) is scheduled to fly.

The number of QoE agents involved in QoE testing, the types of measurements performed, and/or the location of QoE agents in which type(s) of devices (e.g., PED, SVDU, WiFi AP based, etc.) involved in QoE testing can be controlled based on information indicating which airline operator is operative the aircraft, which connectivity service provider is providing connectivity services for the aircraft, etc. The QoE testing and reporting can thereby target part of an airline fleet having a defined aircraft platform, connectivity equipment architecture, and/or being served by a particular connectivity service provider.

The number of QoE agents which are operating at any defined time in an aircraft may be controlled based on instructions from passengers, crew, and/or operators who are offboard the aircraft, e.g., at the operations center 100. Increased numbers of QoE agents and diversity of types of QoE testing and resulting QoE metrics can provide more detailed representation of a wider spectrum of QoE indicators and enable more detailed assessment of the performances experienced by many users operating with contention for shared but finite amount of communication resources.

Example QoE Tests and Generated Metrics:

QoE agents according to some embodiments can collect data for many and distributed users throughout the cabin and for many different aircraft in order to provide statistics and reports at the aircraft fleet level. The operations center 100 can process the reported QoE metrics through operations to, for example, filter (exclude certain metrics), statistically or otherwise algorithmically combine metrics, and/or correlate metrics coming from different sources to identify connectivity issues and root causes of the issues.

QoE agents can be configured to perform any one or more of the following examples of QoE measurements to network node(s) 90 (unless if stated otherwise) and/or to onboard devices responsive to, for example, testing configuration requested by operators (other performance and QoE metrics can be tested as well):

1. End-to-end Ping latency or Round-Trip Delay
2. End-to-end Ping loss or packet loss
3. On-board Ping latency (measurement between QoE Agent and connectivity server 220 and/or IFE content server 20)
4. On-board Ping loss (measurement between QoE Agent and connectivity server 220 and/or IFE content server 20)
5. Download speed test or Downlink bandwidth
6. Upload speed test or Uplink bandwidth
7. Throughput for file transfer
8. Portal loading time
9. Portal loading successful rate
10. DNS query duration
11. Webpage loading time
12. Webpage First Contentful Paint (FCP)
13. Webpage Largest Contentful Paint (LCP)
14. Webpage loading successful rate
15. Webpage service quality
16. Streaming start time (time to start playback)
17. Streaming re-buffering (or stalling) duration
18. Streaming re-buffering (or stalling) count 19. Streaming successful rate (or error rate)
20. Streaming bitrate
21. Streaming data usage
22. Video resolution
23. Whitelisting (or allow listing)
24. Blacklisting (or block listing)

The operating center 100 and the crew terminals 232 may display dashboards which can be used by users (operators) to monitor QoE of the communication connectivity service, and which may support sufficient detailed display of QoE metrics and associated parameters to facilitate troubleshooting of what connectivity system components and/or operations thereof are a root cause of problematic QoE. The dashboards may support any one or more of the following indicators, in addition to the detailed measurements of the metrics provided above:

Overall QoE scoring and/or value or level indication;
Web browsing QoE scoring and/or value or level indication;
Video streaming QoE scoring and/or value or level indication;
Audio streaming QoE scoring and/or value or level indication;
Streaming QoE scoring and/or value or level indication;
Portal QoE scoring and/or value or level indication; and
Network or performance scoring and/or value or level indication.

Additional measurements and scoring or indicators can be provided for other applications or services (e.g., tunneling, social media, file transfer, emailing, gaming).

Figure 3:
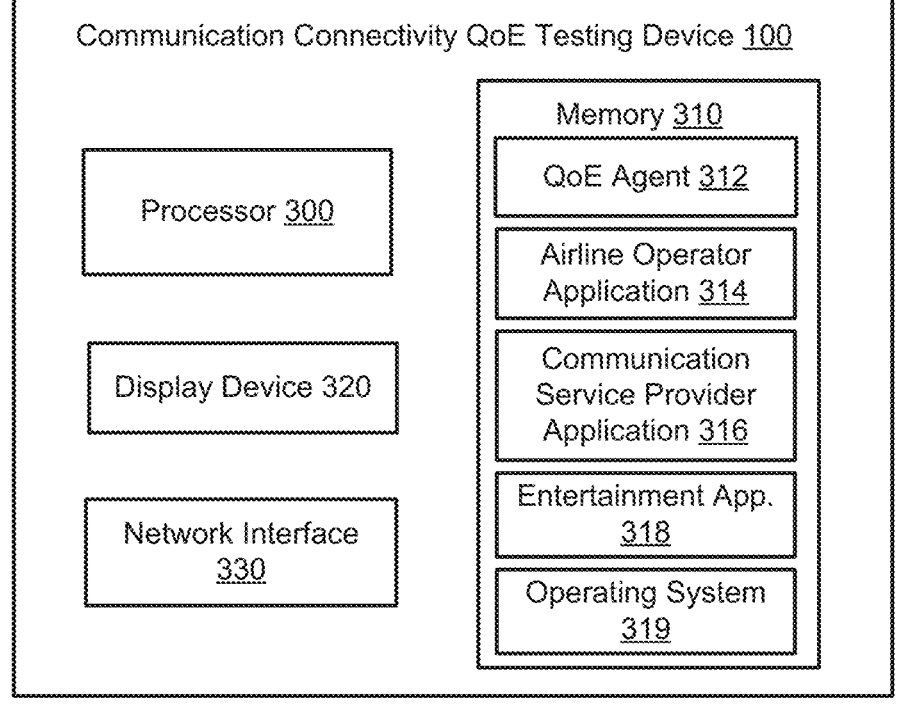
FIG. 3 illustrates a simplified block diagram of components of a QoE testing device which are configured to operate in accordance with some embodiments.

FIG. 3 illustrates a simplified block diagram of components of a communication connectivity QoE testing device 100 which are configured to operate in accordance with some embodiments. The QoE testing device 100 can include at least one processor 300 (also referred to as a processor), at least one memory 310 (also referred to as a memory), at least one network interface 330 (also referred to as a network interface), and at least one display device 320 (also referred as a display device). The processor 300 is operationally connected to these various components. The memory 310 stores instructions that are executed by the processor 300 to perform operations and methods according to any one or more of the embodiments disclosed herein. The memory 310 includes an operating system 319 and the QoE agent 312 which may be operationally associated with an airline operator application 314, a communication service provider application 316, and/or an entertainment application 318 (e.g., streaming content service such as NETFLIX, DIRECTV, and HULU, an online gaming application, etc.). The QoE agent 312 may be configured as an application wrapper that is coded to observe or is granted permission to observe (e.g., by the operating system 319 and/or user setting) application programming interface (API) traffic to and from another application executed by the processor 300, e.g., observing API traffic to and from the airline operator application 314, the communication service provider application 316, and/or the entertainment application 318. The processor 600 may include one or more data processing circuits, such as a general purpose and/or special purpose processor (e.g., microprocessor and/or digital signal processor), which may be collocated or distributed across one or more data networks.

Further Definitions and Embodiments

In the above description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a non-transitory computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A non-transitory computer-readable medium may include an electronic, magnetic, optical, electromagnetic, or semiconductor data storage system, apparatus, or device. More specific examples of the computer-readable medium would include the following: a portable computer diskette, a random-access memory (RAM) circuit, a read-only memory (ROM) circuit, an erasable programmable read-only memory (EPROM or Flash memory) circuit, etc.

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A communication connectivity quality-of-experience (QoE) testing device within a vehicle, the communication connectivity QoE testing device comprising:
a network interface configured to communicate through a cabin network;
a display device configured to display video to a passenger of the vehicle;
a processor; and
a memory storing computer readable program code executed by the processor to perform operations comprising to:
send content requests to and receive content from a content server that is offboard the vehicle using the network interface, the cabin network, and a wireless communication modem communicatively connected to the content server through a ground-based network;
generate a QoE metric based on measurements of end-to-end communications of the content requests sent and the content received between the communication connectivity QoE testing device and the content server;
send a report based on the QoE metric through the network interface, the cabin network, and the wireless communication modem to a network node of an operations center for analysis; and
perform:
initiate QoE testing and/or QoE metric reporting responsive to a handover event indicating handover is being initiated or will be initiated within a threshold time from one satellite to another satellite or responsive to a handover event indicating handover from one cellular radio network node to another radio network node, or
initiate QoE testing and/or QoE metric reporting responsive to determining elevation angle of a beam between a satellite antenna on the vehicle and a satellite presently providing a ground data link for the cabin network satisfies a defined rule or determining a declination angle of a beam between a cellular antenna on the vehicle and a cellular radio network node providing a ground data link for the cabin network satisfies the defined rule.

2. The communication connectivity QoE testing device of claim 1, wherein the network interface, the display device, the processor, and the memory are integrated within a seat display unit associated with a passenger seat.

3. The communication connectivity QoE testing device of claim 2, wherein:
the cabin network is connected to a satellite communications modem;
the communication connectivity QoE testing device comprises a QoE agent executed by the seat display unit; and
the QoE metric is generated by the QoE agent based on measurements of communications between the seat display unit and the content server through the cabin network, the satellite communications modem, a satellite communications network, and the ground-based network.

4. The communication connectivity QoE testing device of claim 1, wherein the network interface, the display device, the processor, and the memory are integrated within a passenger electronic device, wherein the computer readable program code is part of a transportation service provider application or a communication connectivity service provider application downloaded to the passenger electronic device from an application store.

5. The communication connectivity QoE testing device of claim 4, wherein:

the cabin network comprises a wireless access point networked with a satellite communications modem;

the communication connectivity QoE testing device comprises a QoE agent executed by the passenger electronic device; and the QoE metric is generated by the QoE agent based on measurements of communications between the passenger electronic device and the content server through the wireless access point, the satellite communications modem, a satellite communications network, and the ground-based network.

6. The communication connectivity QoE testing device of claim 1, wherein the operations to generate the QoE metric based on measurements of end-to-end communications of the content requests sent and the content received between the communication connectivity QoE testing device and the content server, comprise to:

send a webpage request through the network interface to the content server;

receive and display webpage content from the content server on the display device; and generate the QoE metric based on measurements related to sending of the webpage request and when operations to initially display the webpage content on the display device are completed.

7. The communication connectivity QoE testing device of claim 1, wherein the operations to generate the QoE metric based on measurements of end-to-end communications of the content requests sent and the content received between the communication connectivity QoE testing device and the content server, comprise to:

send a webpage request through the network interface to the content server;

receive webpage content from the content server on the display device;

discard the webpage content without having allowed display of any of the webpage content on the display device; and generate the QoE metric based on measurements related to sending of the webpage request and receipt of all of the webpage content.

8. The communication connectivity QoE testing device of claim 1, wherein the operations to generate the QoE metric based on measurements of end-to-end communications of the content requests sent and the content received between the communication connectivity QoE testing device and the content server, comprise to:

send a video streaming request through the network interface to the content server;

receive a stream of video packets from the content server;

discard the video packets without having allowed display of any video content of the video packets on the display device; and generate the QoE metric based on measurements related to sending of the video streaming request and receipt of a defined number of the video packets.

9. The communication connectivity QoE testing device of claim 1, wherein the operations to generate the QoE metric based on measurements of end-to-end communications of the content requests sent and the content received between the communication connectivity QoE testing device and the content server, comprise to:

send an audio streaming request through the network interface to the content server;

receive a stream of audio packets from the content server;

discard the audio packets without having allowed play out of any audio content of the audio packets through a speaker interface; and generate the QoE metric based on measurements related to sending of the audio streaming request and receipt of a defined number of the audio packets.

10. The communication connectivity QoE testing device of claim 1, wherein the operations further comprise to:

obtain an identifier of a device that the QoE testing device is integrated within, wherein the report includes the identifier logically associated with the QoE metric in the report.

11. The communication connectivity QoE testing device of claim 1, wherein the operations further comprise to:

initiate QoE testing and/or QoE metric reporting responsive to determining a signal quality for communications received by a satellite communications modem do not satisfy a defined rule or responsive to determining a signal quality for communications received by a cellular modem do not satisfy the defined rule.

12. The communication connectivity QoE testing device of claim 1, wherein the operations further comprise to:

control a number of QoE agents activated, types of QoE testing and/or QoE metrics generated, frequency of QoE testing and/or the sending of the report, or in which devices QoE agents are hosted, based on network loading satisfying a defined loading condition, based in identifying a possible failure condition of on-board communication equipment, based on identifying a possible erroneous operation of on-board communication equipment, or based on identifying a low performance communications condition that does not satisfy a defined rule.

13. The communication connectivity QoE testing device of claim 1, wherein the operations further comprise to:

control a number of QoE agents activated, types of QoE testing and/or QoE metrics generated, frequency of QoE testing and/or the sending of the report, or in which devices QoE agents are hosted, based on whether the communication connectivity QoE testing device is within an aircraft having a tail number that is identified as being among a defined list, based on information indicating which airline operator is operative the aircraft, or based on which connectivity service provider is providing connectivity services for the aircraft.

14. The communication connectivity QoE testing device of claim 1, wherein the operations further comprise to:

control a number of QoE agents activated, types of QoE testing and/or QoE metrics generated, frequency of QoE testing and/or the sending of the report, or in which devices QoE agents are hosted, based on instructions from passengers, crew, and/or the operations center.

15. A communication connectivity quality-of-experience (QoE) testing device within a vehicle, the communication connectivity QoE testing device comprising:

a network interface configured to communicate through a cabin network;

a display device configured to display video to a passenger of the vehicle;

a processor; and a memory storing computer readable program code executed by the processor to perform operations comprising to:

send content requests to and receive content from a content server that is offboard the vehicle using the network interface, the cabin network, and a wireless communication modem communicatively connected to the content server through a ground-based network;

generate a QoE metric based on measurements of end-to-end communications of the content requests sent and the content received between the communication connectivity QoE testing device and the content server;

send a report based on the QoE metric through the network interface, the cabin network, and the wireless communication modem to a network node of an operations center for analysis; and perform one of the following:

obtain satellite communications information identifying elevation angle between a satellite antenna on the vehicle and a satellite connected to the ground-based network or identifying satellite communications modem configuration parameters, and wherein the report includes the satellite communications information logically associated with the QoE metric; or obtain cellular communications information identifying declination angle between a cellular antenna on the vehicle and a cellular radio network node connected to the ground-based network or identifying cellular modem configuration parameters, and wherein the report includes the cellular communications information logically associated with the QoE metric.

16. A communication connectivity quality-of-experience (QoE) testing device within a vehicle, the communication connectivity QoE testing device comprising:

a network interface configured to communicate through a cabin network;

a display device configured to display video to a passenger of the vehicle;

a processor; and a memory storing computer readable program code executed by the processor to perform operations comprising to:

send content requests to and receive content from a content server that is offboard the vehicle using the network interface, the cabin network, and a wireless communication modem communicatively connected to the content server through a ground-based network;

generate a QoE metric based on measurements of end-to-end communications of the content requests sent and the content received between the communication connectivity QoE testing device and the content server;

send a report based on the QoE metric through the network interface, the cabin network, and the wireless communication modem to a network node of an operations center for analysis; and wherein the operations to generate the QoE metric based on measurements of end-to-end communications of the content requests sent and the content received between the communication connectivity QoE testing device and the content server, comprise to:

send a gaming command through the network interface to a gaming server to request the gaming server to acknowledge receipt of the command but to not input the gaming command to a game which is hosted by the gaming server and being played by a passenger using the display device;

receive an acknowledge message from the gaming server; and generate the QoE metric based on measurements related to sending of the gaming command and receipt of the acknowledge message.

17. A communication connectivity quality-of-experience (QoE) testing device within a vehicle, the communication connectivity QoE testing device comprising:

a network interface configured to communicate through a cabin network;

a display device configured to display video to a passenger of the vehicle;

a processor; and a memory storing computer readable program code executed by the processor to perform operations comprising to:

send content requests to and receive content from a content server that is offboard the vehicle using the network interface, the cabin network, and a wireless communication modem communicatively connected to the content server through a ground-based network;

generate a QoE metric based on measurements of end-to-end communications of the content requests sent and the content received between the communication connectivity QoE testing device and the content server;

send a report based on the QoE metric through the network interface, the cabin network, and the wireless communication modem to a network node of an operations center for analysis; and wherein the operations to generate the QoE metric based on measurements of end-to-end communications of the content requests sent and the content received between the communication connectivity QoE testing device and the content server, comprise to:

send a gaming command through the network interface to a gaming server;

receive a gaming response message from the gaming server containing updated gameplay content directed to a gaming application being executed by the processor from the memory to update gameplay for the passenger;

discard the updated gameplay content from the gaming response message without being provided to the gaming application; and generate the QoE metric based on measurements related to sending of the gaming command and receipt of the gaming response message.

* * * * *